United States Patent [19]

Schultz, Jr.

[11] 4,037,486
[45] July 26, 1977

[54] PULLEY

[75] Inventor: Edward H. Schultz, Jr., Glencoe, Ill.

[73] Assignee: Nagel-Chase Manufacturing Company, Chicago, Ill.

[21] Appl. No.: 648,249

[22] Filed: Jan. 12, 1976

[51] Int. Cl.² .................................................. F16H 55/54
[52] U.S. Cl. .................................. 74/230.8; 29/159 R
[58] Field of Search ...................... 74/230.3, 230.8; 29/159 R

[56] References Cited

U.S. PATENT DOCUMENTS

| 1,700,416 | 1/1929 | Nelson | 74/230.8 |
| 1,995,907 | 3/1935 | Stoll | 74/230.8 |
| 2,051,501 | 8/1936 | Sorensen et al. | 29/159 R |
| 2,092,571 | 9/1937 | Cole | 74/230.8 |
| 2,253,774 | 8/1941 | Eppler | 74/230.8 |
| 2,738,681 | 3/1956 | Schultz, Jr. | 74/230.8 |
| 2,827,225 | 3/1958 | Killian | 29/159 R |
| 3,069,919 | 12/1962 | Schultz, Jr. | 74/230.8 |
| 3,962,926 | 6/1976 | Kotlar | 74/230.3 |

Primary Examiner—Samuel Scott
Assistant Examiner—Allan R. Burke
Attorney, Agent, or Firm—Olson, Trexler, Wolters, Bushnell & Fosse, Ltd.

[57] ABSTRACT

An inexpensive pulley assembly is disclosed which accommodates a number of driving belts. The pulley includes a hub and a number of sheet metal members. These sheet metal members includes bases for attachment to the hub, inner flanges, sleeves flaring axially away from the inner flanges, and outer flanges. When the sheet metal members are assembled on the hub in an appropriately aligned and opposed array, the opposed, facing flanges form the belt-accommodating pulley assembly. The sheet metal members are rigidly attached to the hub by brazing and staking.

9 Claims, 2 Drawing Figures

PULLEY

BACKGROUND OF THE INVENTION

This invention relates generally to pulleys or sheaves and more particularly concerns a pulley for accommodating a multitude of drive belts which can be constructed at low cost.

In today's market, the cost of even small components plays a major factor in determining the competitive pricing of home appliances and like finished products. Thus, the manufacture of multi-belt-accepting pulleys at minimal completed cost is commercially important. Performance of such pulleys and finished products can be improved in some instances by providing a relatively light weight pulley having a low moment of inertia. It is, of course, well known that commercial desirability of a finished product is improved when the service life of a component is of extended length.

Light weight, low cost pulleys have been assembled with success from a number of parts, as disclosed in U.S. Pat. Nos. 3,069,919, 3,094,881 and 3,722,310. These pulleys have, however, been adapted for use with but one or two drive belts.

It is the general object of the present invention to provide a low cost, light weight multi-groove pulley which can be expected to provide a relatively long service life.

It is another object of the invention to provide such a pulley which can be easily assembled from component parts which are, in turn, manufactured with relative ease and little expense.

Yet another object is to provide such a pulley in which the manufacturing and fabrication steps are of minimal cost.

Other objects and advantages of the invention will become apparent upon reading the following detailed description and upon reference to the drawings. Throughout the description, like reference numerals refer to like parts.

DETAILED DESCRIPTION

Figure 1:
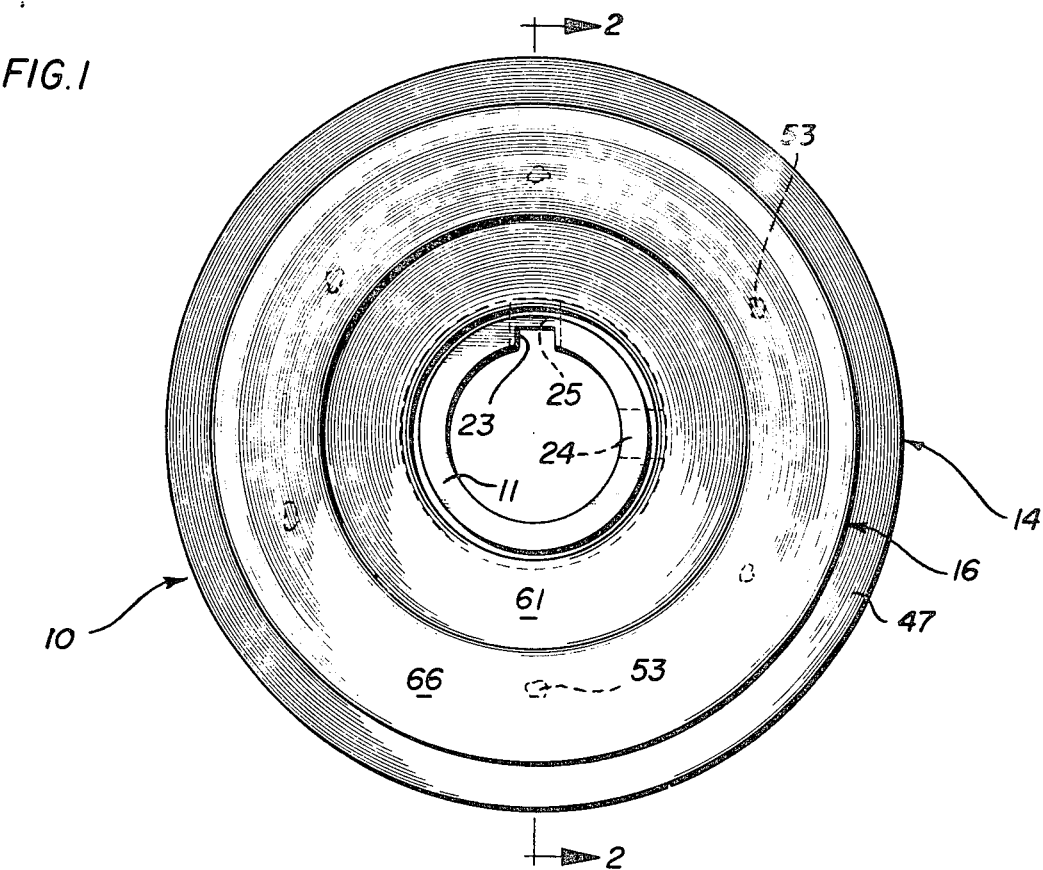
FIG. 1 is an elevational view of a pulley embodying the present invention.

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning more specifically to the drawings, there is shown a pulley 10 embodying the present invention which is adapted to receive a multiplicity of drive belts such as V-belts. In accordance with the invention, a light-weight, low-inertia pulley is provided for accommodating four drive belts by manufacturing the pulley as an assembly of component parts. More specifically, the pulley 10 can be considered to include a cylindrical, axially elongated hub 11 and a number of flared sheet metal members 12 – 16 inclusive.

To provide a secure mounting base for the sheet metal members 12 – 16, the hub 11 is provided with a forward shoulder 20 formed at one end of the hub 11, and an opposed rearward shoulder 21 at the other hub end. To maximize the adaptability of this pulley to a number of different installation arrangements, the hub 11 can be provided with a keyway 23 and a set-screw-accepting threaded bore 24. A second set-screw-accepting bore 25 can be formed for use in conjunction with a key (not shown) and the keyway 23.

In accordance with the invention, the sheet metal members 12 – 16 are inexpensively formed by known metal-shaping operations. A first sheet metal member 12 is provided with a base 30 for attachment to the hub 11 and a flange portion 31 which flares outwardly and forwardly from the base 30 and hub 11.

The second sheet metal member 13 is provided with a similar base 33 for attachment to the hub 11. Immediately adjacent this base 33, an inner flange flares outwardly (and here, rearwardly) in a mirror image of the first member flange 31. These two opposing flanges 31 and 34 form a first belt accepting groove 36. To provide spacing for other pulley parts, a sleeve 38 flares axially above the inner flange 34. If desired, an aperture or hole 39 aligned with the hub bore 25 can be provided in this sleeve 38 to accommodate insertion of a set screw or set screw-adjusting tool. Above the second member sleeve 38 is an outer flange 41 which is here flared radially outwardly and in an axial direction opposite to the inner flange 34. The third sheet metal member 14 is similar in construction to the second member 13. If also includes a base 44, an inner flange 45 flaring outwardly from the base in an axially forward direction, a sleeve 46 and, radially outwardly thereof, an outer flange 47 flaring away from the sleeve 46 in an axial direction opposite to the direction of flare of the inner flange 45. In the interests of economy, this third sheet metal member 14 can be made as a part identical to the second member 13; if axial spacing of the accommodated belts or if the dimensions of the set screw hole 39 require, the respective sleeve portions 38 and 46 can be formed of unequal length. The second and third members 13 and 14 are assembled on the hub 11 in opposed relations, the thus-opposed outer flanges 41 and 47 thereby forming a second or outer belt-accommodating groove 49.

Figure 2:
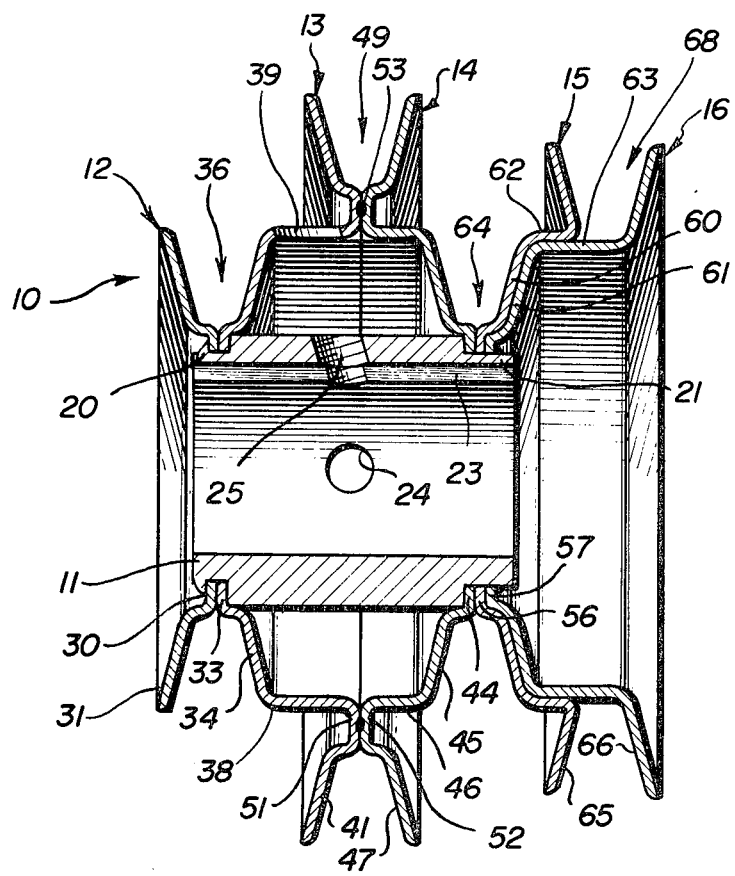
FIG. 2 is a sectionsl view of the pulley taken substantially in the plane of line 2—2 in FIG. 1.

Each of the second and third members 13 and 14 has formed, between its respective sleeve and outer sleeve and outer flange, a reversely turned connector portion 51 or 52. When the second and third sheet metal members 13 and 14 are reversely oriented as illustrated in FIG. 2, these connector portions 51 and 52 are brought into abutted engagement for rigid interconnection, as by equally spaced spot welds 53 or other known connection constructions.

Like the preceeding members 12 – 14 inclusive, the fourth and fifth members 15 and 16 are provided with bases 56 and 57, respectively, for attachment to the hub 11. Each member is formed with an inner flange 60 and 61 flaring radially and axially outwardly from the hub which rolls smoothly into sleeves 62 and 63, respectively, which flare from the respective inner flanges. In the present invention, these inner flanges and sleeves are adapted to nestably mate with one another. If the interests of pulley rigidity and long service life demand, these parts can be sized to fit one another with a press fit; they can be welded or otherwise permanently fastened to one another if increased or further enhanced pulley rigidity is desired. It will be noted that the inner flanges 45 and 60 of the third and fourth member 14 and 15 are located in opposed relation and thereby form a third belt-accommodating groove 64.

The sheet metal members 15 and 16 are each provided with outer flanges 65 and 66 which flare outwardly away from the respective nested sleeves 62 and 63 in opposite axial directions to form a fourth belt-accommodating groove 68. In the illustrated embodiment of the invention, the sleeves 62 and 63 are of unequal length and this groove 68 is located axially and radially outwardly of the pulley hub 11.

When the hub 11 and sheet metal parts 12 – 16 inclusive are formed as described and illustrated, the belt grooves are of various effective diameters. The first member flange 31 and the second member inner flange 34 form a first belt-accommodating groove 36; the second and third member outer flanges 41 and 47 together form a second belt-accommodating groove 49. The inner flanges 45 and 60 of the third member 14 and fourth member 15 together form a third belt-accommodating groove 64, and the fourth and fifth member outer flanges 65 and 66 form a fourth belt-accommodating groove 68.

To insure that this pulley assembly retains its rigid, unitary form at little additional cost in accordance with the invention, the first and second members 12 and 13 are staked and brazed to the forward hub shoulder 20. The third, fourth, and fifth members 14 – 16 inclusive are similarly staked and brazed to the rearward hub shoulder 21.

The invention is claimed as follows:

1. A multi-groove pulley, comprising the combination of a cylindrical, axially elongated hub, a first non-folded sheet metal member having a base for attachment to the hub and a flange flaring simultaneously radially and axially diagonally outwardly away from the base, and second, third, fourth and fifth sheet non-folded metal members each having a base for attachment to the hub, an inner flange flaring simultaneously radially and axially diagonally outwardly from the base, a sleeve extending axially from the inner flange, and an outer flange flaring simultaneously radially and axially diagonally outwardly from the sleeve, all the sheet metal members being abuttively assembled on the hub for forming a plurality of belt-accommodating grooves wherein said sheet metal members are assembled on said hub in a mutually opposed and aligned array so that the first member flange and second member inner flange form a first belt-accommodating groove, the second and third member outer flanges form a second belt-accommodating groove, the third and fourth member inner flanges form a third belt-accommodating groove, the fourth and fifth member outer flanges form a fouth belt-accommodating groove.

2. A pulley according to claim 1 wherein said sheet metal members are staked and brazed to said hub.

3. A pulley according to claim 1 wherein second and third sheet metal members are each provided with reversely turned connector portions interposed between said sleeve and said outer flange, the second and third sheet metal members being relatively reversely oriented on said pulley hub to bring the respective connector portions into abuttive engagement for rigid interconnection.

4. A pulley according to claim 3 wherein said connector portions are spot welded to one another and wherein said sheet metal members are staked and brazed to said hub.

5. A pulley according to claim 1 including a forward shoulder formed at one end of said hub and a rearward shoulder formed at the other end of said hub, the bases of said first and second members being affixed to the forward hub shoulder, and the bases of said third, fourth and fifth members being affixed to the rearward hub shoulder 6. A multi-groove pulley, comprising the combination of a cylindrical, axially elongated hub, a first non-folded sheet metal member having a base for attachment to the hub and a flange flaring simultaneously radially and axially diagonally outwardly away from the base, second and third non-folded sheet metal members each having a base for attachment to the hub, an inner flange flaring simultaneously radially and axially diagonally outwardly from the base in a given axial direction, a sleeve extending axially from the inner flange, and an outer flange flaring simultaneously radially and axially diagonally outwardly from the sleeve in an axial direction opposite to the axial direction of flare of the inner flange, the pulley further comprising fourth and fifth non-folded sheet metal members each having a base for attachment to the hub, an inner flange flaring simultaneously radially and axially diagonally outwardly from the base and a sleeve extending axially from the inner flange, the fourth and fifth member inner flanges and sleeves being adapted to nestably mate with one another, the fourth and fifth member each having outer flanges flaring simultaneously radially and axially diagonally outwardly away from the respective nested sleeves in opposite axial directions to form a belt-accommodating groove.

7. A pulley according to claim 6 wherein the fourth and fifth member sleeves are of unequal length to form a belt-accommodating groove located axially and radially outwardly of the pulley hub.

8. A pulley according to claim 6 wherein said second and third sheet metal members are assembled on the hub in opposed relations, the thus-opposed outer flanges thereby forming an outer belt-accommodating groove.

9. A pulley according to claim 8 wherein said second and third sheet metal member sleeves are of unequal length to accommodate, through one sleeve, insertion and adjustment of a set screw.

* * * * *